(12) United States Patent
Hsueh

(10) Patent No.: US 6,652,132 B1
(45) Date of Patent: Nov. 25, 2003

(54) POTTING LOUDSPEAKER BOX

(76) Inventor: Chih-Yuan Hsueh, 5F., No. 4, Alley 30, Sublane 137, Lane 991, Ho-Ping Rd., Pa Teh City, Tauyuan Hsien (TW)

( * ) Notice: Subject to any disclaimer, the term of this patent is extended or adjusted under 35 U.S.C. 154(b) by 0 days.

(21) Appl. No.: 10/138,500

(22) Filed: May 6, 2002

(51) Int. Cl.[7] .............................. A47G 7/07; F21V 8/00; F21V 33/00
(52) U.S. Cl. ........................ 362/567; 362/86; 362/122
(58) Field of Search .......................... 362/86, 122, 123, 362/563–565, 567, 568, 559; 40/455–457

(56) References Cited

U.S. PATENT DOCUMENTS

| | | | | |
|---|---|---|---|---|
| 5,213,407 A | * | 5/1993 | Eisenbraun | 362/123 |
| 5,829,863 A | * | 11/1998 | Gutshall | 362/123 |
| 5,964,519 A | * | 10/1999 | Chun-Ying | 362/86 |
| 6,050,714 A | * | 4/2000 | Isabella | 362/568 |
| 6,438,879 B1 | * | 8/2002 | Kao | 362/568 |

* cited by examiner

*Primary Examiner*—Alan Cariaso

(57) ABSTRACT

A potting loudspeaker box includes a box body having a plurality of through-holes surrounding the periphery of the box body. A loudspeaker is disposed in the box body. A cover plate is provided with a plurality of through-holes. The cover plate covers the loudspeaker, and an artificial bonsai made of a plurality of optical fibers is inserted into the surface of the cover plate.

5 Claims, 3 Drawing Sheets

POTTING LOUDSPEAKER BOX

BACKGROUND OF THE INVENTION

This invention relates generally to a potting loudspeaker box, and more particularly to a potting loudspeaker box having a bonsai as decoration, to have the effect of displaying resplendent lamplight and giving off sound.

In the hustle and bustle of city life, everyone have to keep their body and soul for fighting everyday. Not only fight for the competitive nature of our society, but also prevent from eliminating through the competition. However, people are not made of machinery. People who have a taut mind will feel easily exhausted. Therefore, it is very important to provide physical and mental relaxation by relaxing his or her mind timely, especially after a day's hard work. Music is helpful to relax one's mind. Nevertheless, only a bit of music can not cheer the present generation up, and fails to suffice their demand. If some lamplight is added, it will be able to yield twice the result with half the effort for promptly easing up their mind.

The inventor therefore developed an improved loudspeaker box to eliminate the above-mentioned drawbacks existing in the conventional loudspeaker box by providing a bonsai with decoration to have the effect of displaying resplendent lamplight and giving off sound.

Accordingly, it is a primary object of the present invention claimed herein to provide a potting loudspeaker box, which has a bonsai with decorations to have the effect of displaying resplendent lamplight and giving off sound.

SUMMARY OF THE INVENTION

For reaching the above object, the invention is a potting loudspeaker box which is comprised of a box body having a plurality of through-holes surrounding the peripheral of the box body, a loudspeaker disposed in the box body, and a cover plate with a plurality of through-holes. The cover plate covers the loudspeaker, and an artificial bonsai made of a plurality of optical fibers is inserted into the surface of the cover plate. By virtue of this arrangement, the bonsai with decoration has the effect of displaying resplendent lamplight and giving off sound.

BRIEF DESCRIPTION OF THE DRAWINGS

The above and other objects and the features and functions of the present invention maybe best understood by referring to the following detailed description of the preferred embodiments and the accompanying drawings, wherein.

DETAILED DESCRIPTION OF THE INVENTION

Figure 1:
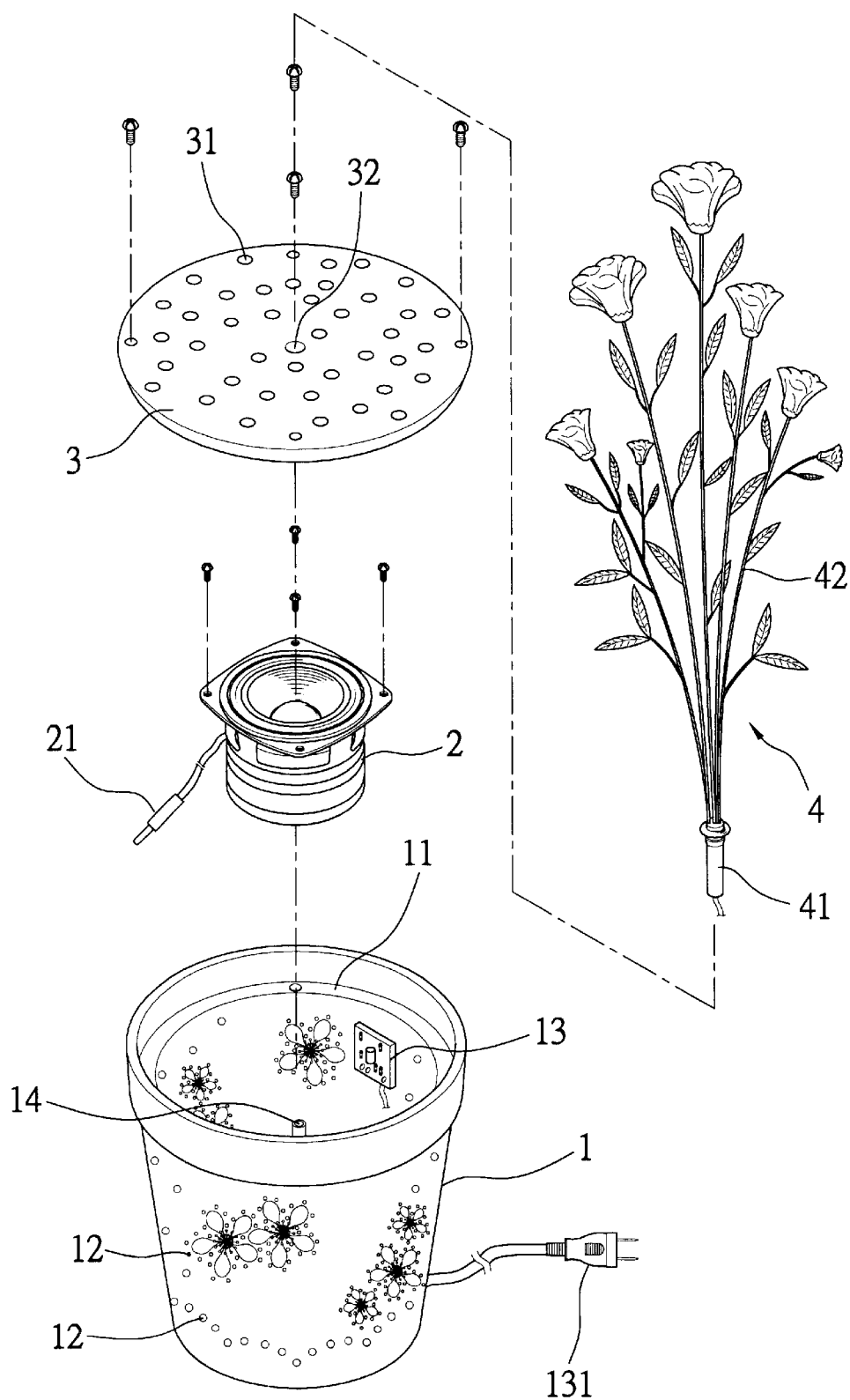
FIG. 1 an exploded isometric view of the potting loudspeaker box according to the present invention.
Figure 2:
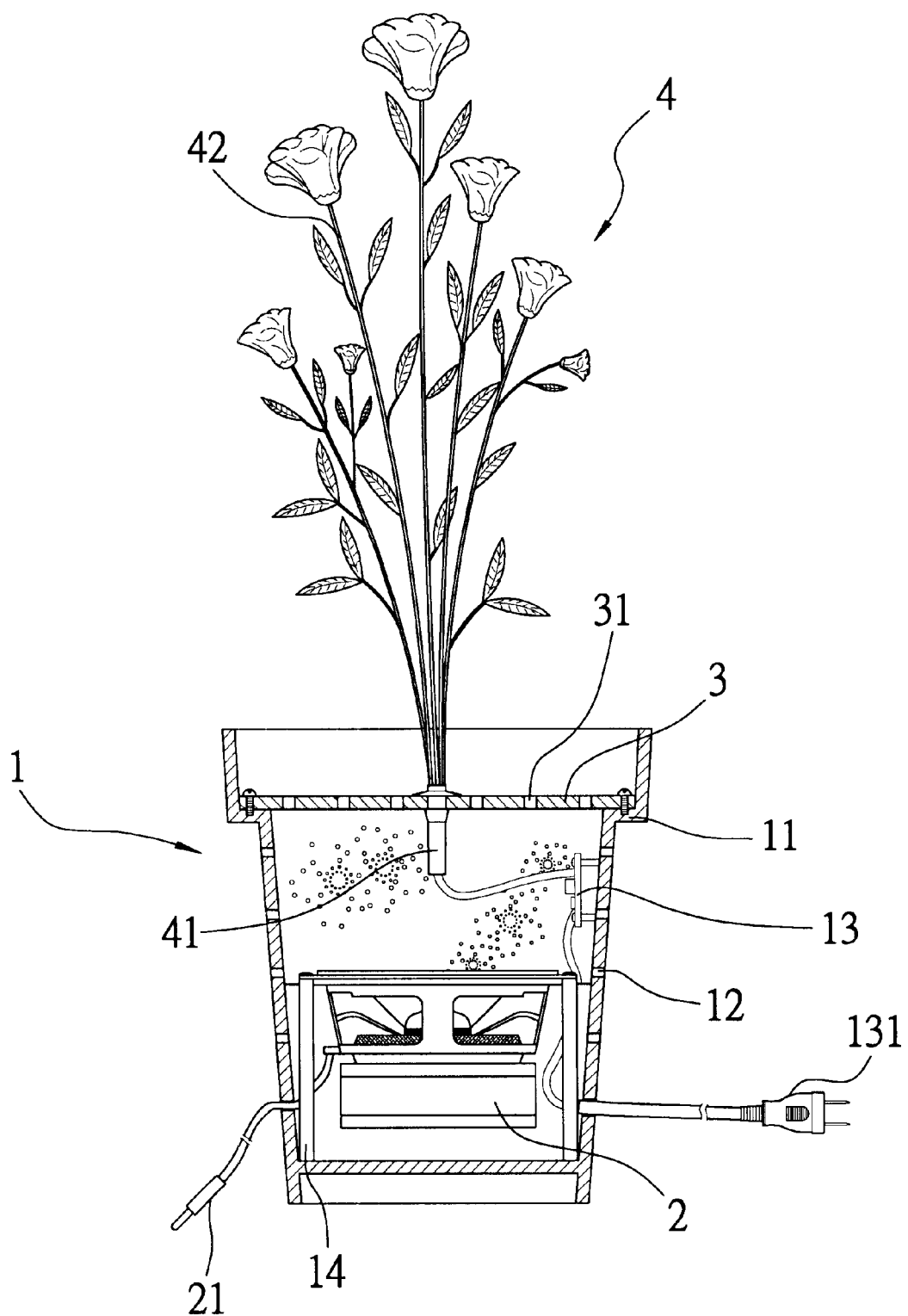
FIG. 2 is an assembled side view of the potting loudspeaker box according to the present invention.

FIG. 1 and FIG. 2 show an exploded isometric view and an assembled side view of the potting loudspeaker box according to the present invention respectively. As shown, a potting loudspeaker box comprises a box body 1, a loudspeaker 2, a cover plate 3 and an artificial bonsai 4.

The box body 1 is formed of a step 11 extending upwardly toward the top of the box body 1 and a plurality of lock-holes provided on the upper surface of the step 11 for connecting to a cover plate with a lock set (i.e., fasteners, such as screws). A plurality of sounding holes 12 are perforated into the peripheral of the box body 1 in accordance with patterns and design. A transformer 13 is provided on the inner surface of the box body 1, which comprises a power cord 131 for connecting to an outside power source. In addition, a plurality of lock bolts 14 are disposed obliquely on the bottom of the box body 1 and which extend upwardly for firmly fixing the lock set of the loudspeaker 2.

The loudspeaker 2 comprises a sound cord 21 coupled to an exterior audio source, and a plurality of lock-holes are provided on the upper surface of the loudspeaker 2 which correspond to the lock set of lock bolts 14.

The cover plate 3 is provided on the step 11 of the box body 1 and corresponds to the lock set on the upper surface of the step 11.

A plurality of sounding holes 31 and a through-hole 32 are perforated into the peripheral of the cover plate 3, wherein the through-holes 32 is used to insert the artificial bonsai 4.

The artificial bonsai 4 comprises a lighting device 41 communicated with the transormer 13 on the bottom of the artificial bonsai 4. A plurality of optical fibers 42 are inserted into the top surface of the lighting device 41. (such as flowers, grasses, short trees and so on).

Figure 3:
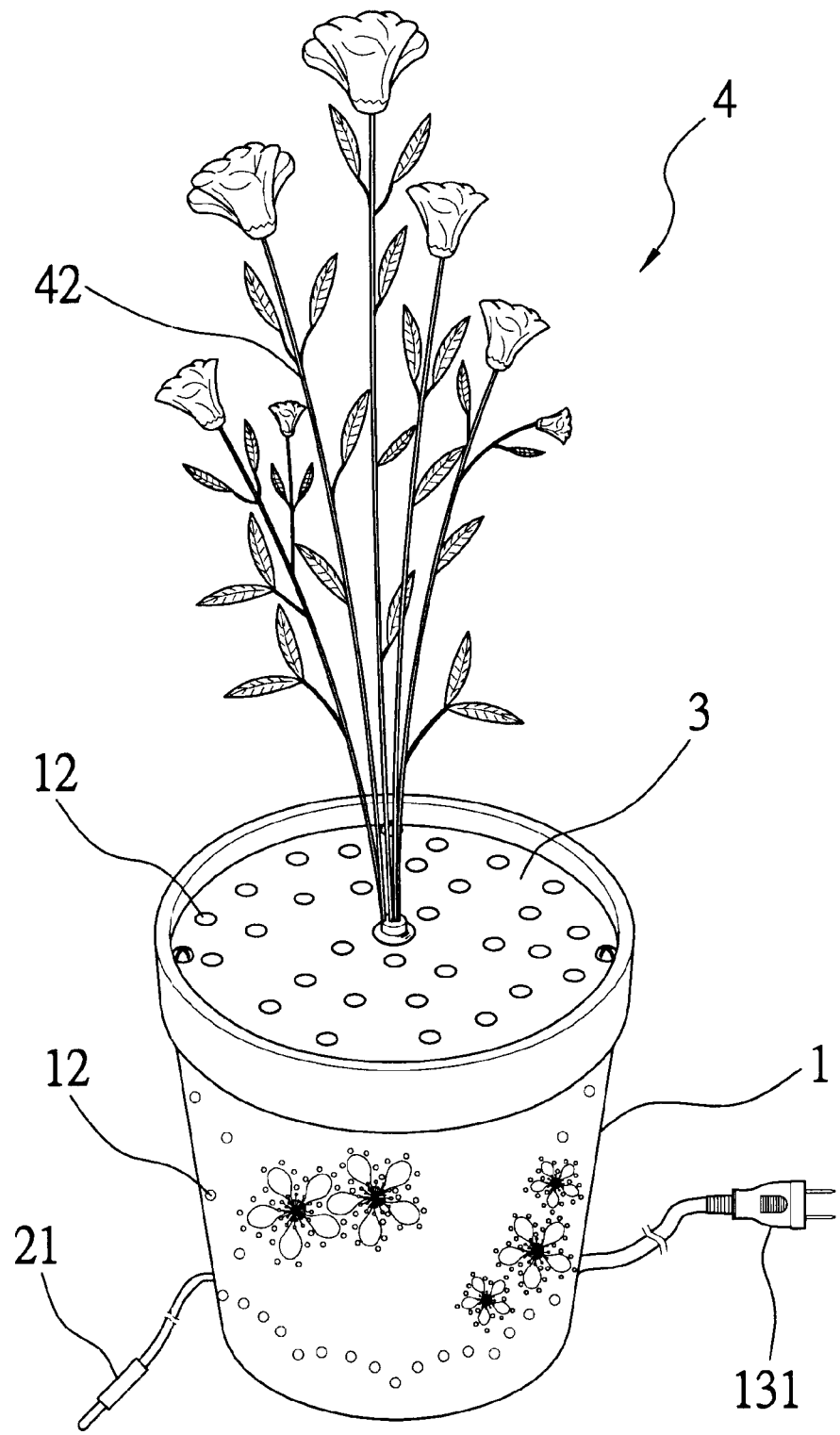
FIG. 3 is a stereogram view of the potting loudspeaker box according to the present invention.

By virtue of this arrangement, during the assembly of potting loudspeaker box, the loudspeaker 2 is disposed into the box body 1 first and corresponding to the lock set of lock bolts 14. The sound cord 21 is propagated through the sounding holes 12 of the box body 1 and is connected to an outside audio. Then, the lighting device 41 of the artificial bonsai 4 is inserted into the through-hole 32 of the cover plate 3 and connected to the transformer 13. Finally, the peripheral of the cover plate 3 is provided on the upper surface of the step 11 of the box body 1 for hiding the content of the box body 1, as shown in FIG. 3. This arrangement enables the bonsai with decoration to have the effect of displaying resplendent lamplight and giving off sound.

After completing the above assembly, a refined artistic ornament is then formed. This potting loudspeaker box can be applied outside and/or inside the house. Meanwhile, when audio is started, the loudspeaker 2 of the box body 1 gives off sound.

Music can be given off more clearly and heard at a greater distance due to the sounding holes 12 and 31. In the night, the power cord 131 of the box body 1 can be connected to a power source for radiating the lighting device 41 and making the optical fibers 42 illuminate. By using the effect of mixing image and sound, a paradise on earth can be shown and physical and mental relaxation is accelerated.

It is not intended, however, that the invention is limited to the particular embodiments described or to use in connection with the apparatus illustrated herein. Various modifications and alternative embodiments such as would ordinarily occur to one skilled in the art to which the invention relates are also contemplated and included within the meaning and range of equivalents of the appended claims.

What is claimed is:

1. A potting loudspeaker box, comprising:
   a box body having a plurality of through-holes disposed around a periphery of the box body;
   a cover plate covering a top of the box body, and having a plurality of through holes formed therein;
   a loudspeaker disposed in the box body and being arranged to face the cover plate, and having a sound cord that extends outside of the box body for coupling with an external audio source;

wherein at least some of the through hole in the box body and at least some of the through holes in the cover plate are in direct communication with an interior of the box body in a region of the loudspeaker, so that when the loudspeaker is coupled to the external audio source and caused to generate sound, the sound is transmitted unimpeded through the some of the through-holes in the cover plate and through the some of the through holes in the box body so that the sound can be heard outside of the box body;

a lighting device provided inside of the box body and under the cover plate; and an artificial plant inserted into at least one of the through holes formed in the cover plate, and including a plurality of optical fibers inserted into the lighting device.

2. The potting loudspeaker box recited in claim 1, wherein the box body has a step formed in an upper region thereof, the step extending upwardly toward a top of the box body, and having an upper surface and a plurality of lock-holes provided on the upper surface, each lock hole being disposed in registration with a respective through hole in the cover plate, and receiving a fastener for connecting the cover plate to the seat.

3. The potting loudspeaker box recited in claim 1, wherein the plurality of through holes in the box body are arranged in accordance with a pattern and design.

4. The potting loudspeaker box recited in claim 1, further comprising a transformer disposed inside the box body; wherein the lighting device is connected to a bottom of the artificial plant, and electrically coupled to the transformer.

5. The potting loudspeaker box recited in claim 4, wherein the transformer includes a power cord for connecting to an outside power source.

\* \* \* \* \*